United States Patent [19]

Iivarinen

[11] 4,291,609

[45] Sep. 29, 1981

[54] APPARATUS FOR ASSEMBLING A PROJECTILE AND A BOOSTER CHARGE CASE TO A SHOT

[76] Inventor: Antero Iivarinen, 74520 Ohenmäki, Finland

[21] Appl. No.: 79,738

[22] Filed: Sep. 28, 1979

[30] Foreign Application Priority Data

Apr. 7, 1977 [FI] Finland .................................. 771117
Oct. 6, 1978 [FI] Finland .................................. 783050

[51] Int. Cl.³ ...................... C06B 21/00; F42C 33/02
[52] U.S. Cl. .......................................... 86/1 R; 86/23
[58] Field of Search ................................. 86/1 R, 23

[56] References Cited

U.S. PATENT DOCUMENTS 3,411,399  11/1968  Griffith .................................. 86/1 R
3,952,628  4/1976  Boswell ................................ 86/1 R Primary Examiner—Leland A. Sebastian
Attorney, Agent, or Firm—Ladas & Parry

[57] ABSTRACT

An apparatus for assembling a projectile, such as a heavy bazooka projectile or an artillery projectile, and a booster charge case to a shot. The apparatus brings the booster charge cast onto the projectile and fixes the case to the projectile by pressing into a peripheral groove of the projectile by means of hydraulically or pneumatically driven members operated by a preprogrammed control system, thus making the presence of a worker unnecessary during the critical steps of the assembling process.

8 Claims, 7 Drawing Figures

APPARATUS FOR ASSEMBLING A PROJECTILE AND A BOOSTER CHARGE CASE TO A SHOT

The present invention relates to an apparatus for assembling a projectile of artillery calibre and a booster charge case to a shot.

Hitherto heavy bazooka and artillery shots comprising a projectile and a booster charge case have been assembled by manually operated apparatuses. One important disadvantage in these manual apparatuses is that the worker's safety cannot be guaranteed as the worker must be present also in the critical stages of assembly when the booster charge case is pressed on the projectile and mangled firmly into a groove in the projectile. Also the quality has been uneven because the mangling pressure has been adjusted manually and the position of the case in relation to the projectile has been set by eye. Moreover, nearly each calibre and machine has had a specific application of its own.

By the known apparatuses, the assembly of shots has been carried out in the horizontal level which, in the assembly of recoil-less shots, such as those of heavy bazooka, has caused one more additional problem. The booster charge cases of these shots are perforated and, to keep the booster charge in place, they are lined, e.g., with paper. When the case is forced over the tail of the projectile, the paper lining, in particular its edges, is easily thorn, resulting in an unreasonably high reject percentage.

The tendency of the upper edge in the lining to tear is due to a certain clearance between the lining attached to the case and the projectile whereby, during horizontal positioning, the upper edge of the lining will be dragged against the projectile and may come loose from the case.

Moreover, it has been difficult to disassemble an incorrectly assembled shot by means of the apparatuses used until now.

The object of this invention is to provide an apparatus by means of which various bazooka and artillery shots can be assembled without endangering the worker's safety, while at the same time obtaining a higher rate of production and a better quality.

This object is achieved by means of the apparatus according to the invention which comprises a frame structure and mounted thereon, means for receiving and holding a projectile, means for receiving a booster charge case and bringing it onto the projectile to a fastening position, means for fastening the booster charge case to the projectile, pneumatically and/or hydraulically operated drive means being provided for actuating said means for receiving and holding the projectile, said means for receiving a booster charge case and bringing it onto the projectile, and said means for fastening the booster charge case to the projectile, said drive means being controlled by a control unit in accordance with a preset programme, the projectile receiving means and the means for fastening the booster charge case to the projectile further being formed as one unit mounted in the frame pivotably between a vertical and an essentially horizontal position. Each operation can be arranged independently of the others and, accordingly, a practically unlimited possibility is obtained to optimize the control programme and thereby the operation of the entire apparatus.

Claims 2 to 8 define preferred embodiments, which will be described in more detail in the following with reference to the accompanying drawings.

Figure 1:
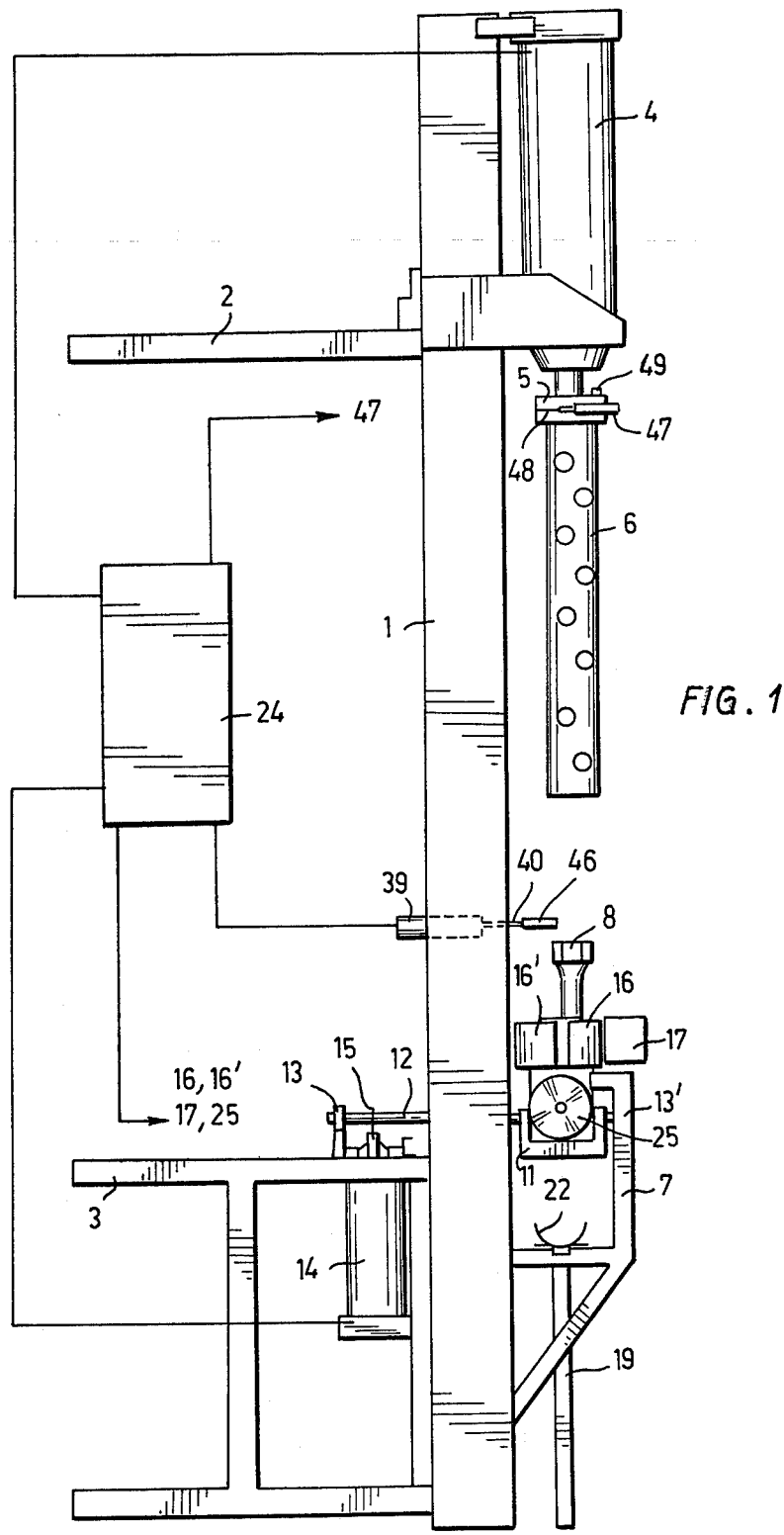
FIG. 1 is a schematic side view of a vertically mounted apparatus according to the invention.
Figure 2:
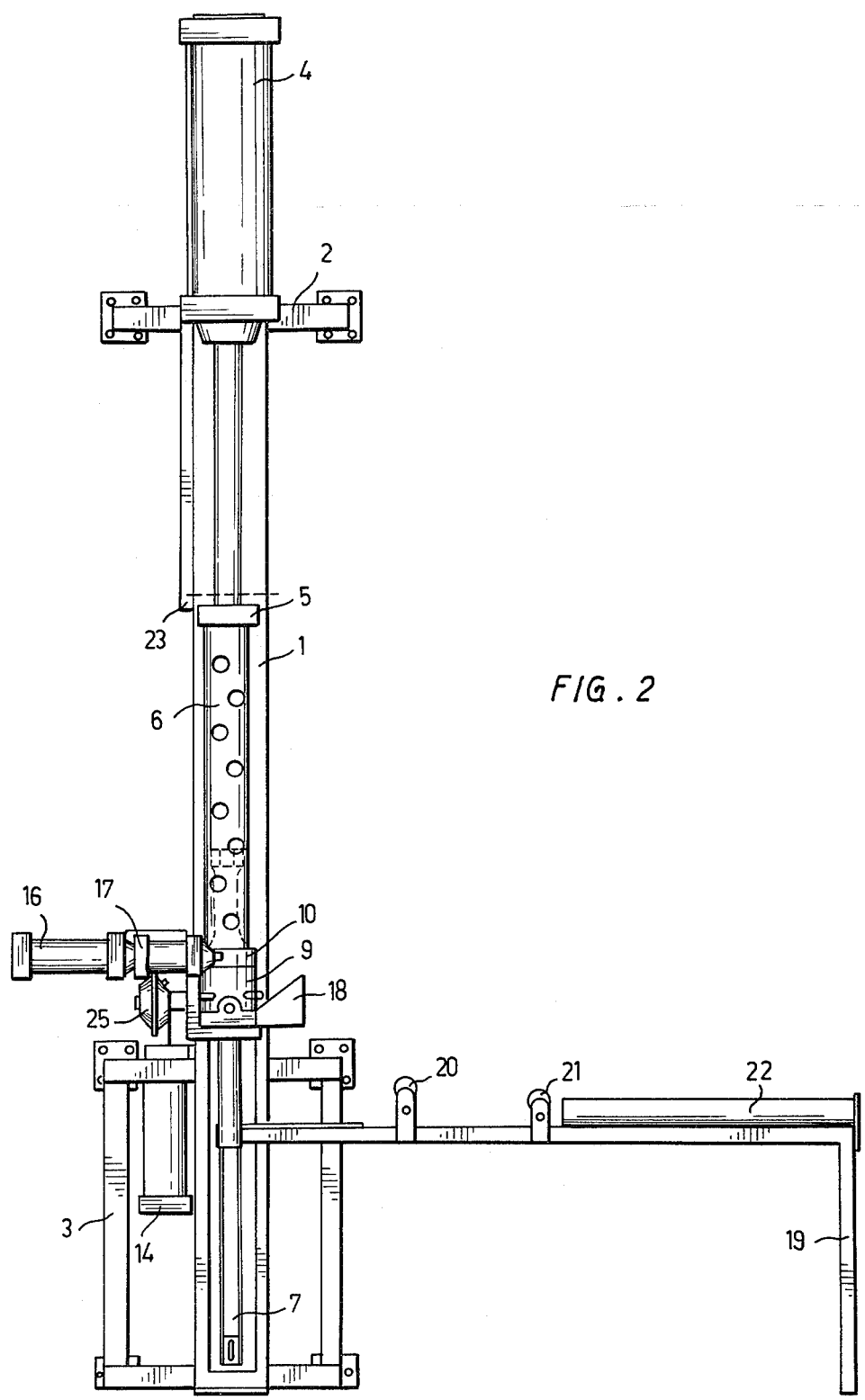
FIG. 2 is a front view of the apparatus in FIG. 1.

FIGS. 1 and 2 illustrate one embodiment of the apparatus according to the invention which is particularly preferred for assembling recoil-less shots, such as heavy bazooka shots. The apparatus comprises a frame 1 fastened to a wall structure at the top by means of a support 2 and at the bottom by means of a support 3. In the upper part of the frame 1 is mounted a pneumatically or hydraulically operating working cylinder 4, a seat 5 being provided at the end of the piston rod thereof for holding a booster charge case 6. The seat 5 engages a flange (not shown in the drawing) of the case 6, for example, by means of three laterally resilient claws known per se.

Immediately under the cylinder 4, at a suitable distance in relation to the size of the shots to be assembled, there is mounted in the frame on a side support 7 a projectile receiving means 9 and in connection therewith a fastening means 10. The unit formed by the projectile receiving means 9 and fastening means 10 is mounted on a swing 11 pivotable on a shaft 12 journalled in support bearings 13 and 13'. This pivotal motion is accomplished by means of a cylinder 14, the schematically outlined piston rod 15 whereof is arranged to act on the shaft through a crank which does not show in the drawings but the location whereof, however, appears from FIG. 2 (behind the projectile receiving means). For balancing the swing 11 a counterweight 18 is attached thereto. At a suitable level in relation to the fastening and mangling unit is mounted a substantially horizontal structure for receiving an assembled shot. This structure comprises preferably receiving rolls 20, and 21 which guide the shot into a groove 22 on a vertical support 19. Block 24 indicates the control unit for the various working cylinders.

The general operation of the apparatus according to the invention is as follows:

The case 6 is placed in the seat 5 at the end of the piston rod of the cylinder 4. A projectile 8 is placed in the receiving means 9, while being in substantially horizontal position. The cylinder 14 then swings the swing 11 together with the projectile 8 into vertical position. The cylinder 4 first forces the case 6 over the tail of the projectile 8 and presses it on the projectile into fixing position. The pusing movement of the cylinder is suitably limited by means of an impulse generator, known per se, which in FIG. 2 is schematically outlined and indicated by numeral 23.

The frame of the swing 11 is provided with a conical stop, the size and shape whereof is determined according to the projectile. The adjustment of the fastening position of the projectile is determined by means of mounting plates between the conical stop and the swing. This arrangement is considered easily understandable and is not shown in the drawings.

When the case 6 is fastened to the projectile 8, the seat 5 is removed from the flange in the case 6 and the cylinder 4 is drawn back into the upper position. The cylinder 14 turns the unit formed by the receiving and fastening means around the shaft 12 substantially to a position at the receiving rolls 20 and 21, whereafter the assembled shot is removed and transferred to the groove 22.

The whole operation is controlled preferably by means of an automatic control unit 24. Protective walls can be constructed around the apparatus, and the worker can from behind said walls supervise the operation of the apparatus at least during the most critical assembling stages, when the cylinder 4 pushes the case into the fastening position, and during the fastening itself. The protective walls are constructed such that, in case of an explosion, the pressure may be discharged without causing excessive damages.

In the following, the operation of the projectile receiving means and the fastening means will be described with reference especially to FIGS. 3 and 4.

Figure 3:
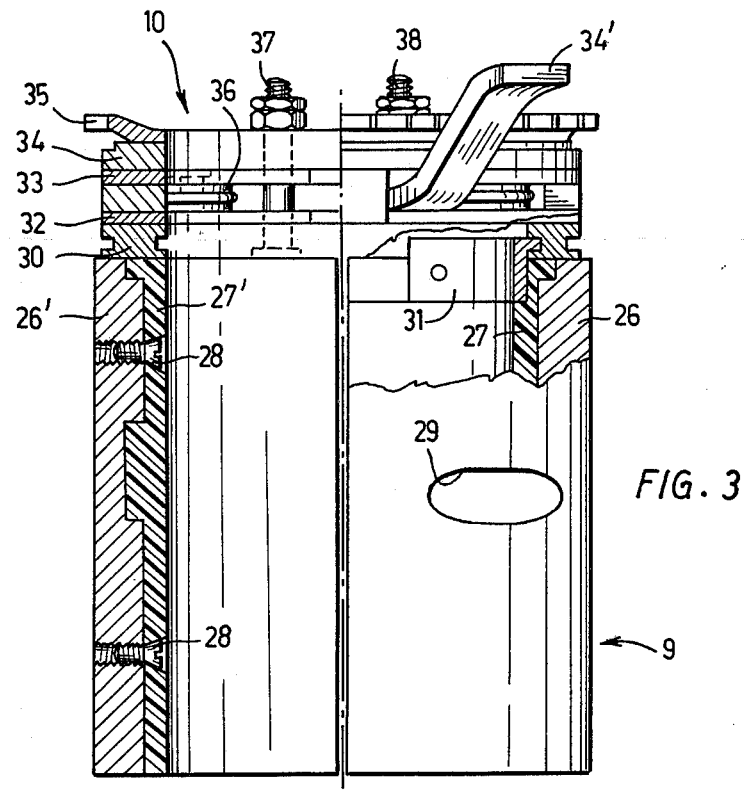
FIGS. 3 and 4 illustrate in more detail two embodiments of the projectile receiving means and the means for fastening the booster charge case to the projectile.

FIG. 3 shows partly in section an embodiment of the projectile receiving means and the means for fastening the booster charge case to the projectile, wherein the fastening operation is performed by a mangling process.

The frame of the receiving means 9 comprises two cylinder halves 26 and 26' to which jaws 27 and 27' are attached by means of screws 28. Through the frame 26,26' and the jaws 27,27' extend two guide shafts on which one of the cylinder halves with the respective jaw moves (in FIG. 3 half 26' and jaw 27'), while the other cylinder half is fixed to the swing frame.

In FIG. 3 these shafts are not shown, but only one opening 29 for a shaft in the stationary part. For moving the jaw 26',27' for example, a compressed-air case 25 is used which is preferably mounted on said guide shafts. The location of the compressed-air case 25 is seen in FIGS. 1 and 2. The movement of the movable jaw is limited, for example, by means of an impulse plate mounted therein and known per se. The above mentioned counterweight 18 is preferably attached to the stationary jaw 26,27.

The mangling means 10 comprises a frame ring 30 attached turnably to the stationary jaw 26,27 of the projectile receiving means 9 by means of one inner claw 31 and two outer claws (not shown in FIG. 3). To the frame ring 30 are connected by means of pins or bolts 37 and 38 mangling jaws 32 and 33, a support plate 34 and a driving member 35 comprising, for example, a gear wheel. The mangling jaw 32 and 33 are hinged around the pins 37 and 38 (preferably located on the rear side of FIG. 3) and provided with projecting arms, whereof only the arm 34' of the jaw 33 is shown. These arms are connected to a cylinder 17 adjusting the mangling pressure (see FIGS. 1 and 2), for example, such that one arm is connected to the cylinder itself and the other arm to the piston rod. The opening of the mangling jaws is limited, for example, by means of stop pins. In the mangling jaws 36 are journalled mangling rolls 36, the number whereof may be, for example, four. To the gear wheel 35 is connected a chain the ends whereof are connected to cylinders 16 and 16' (FIGS. 1 and 2), the reciprocating movement whereof by means of the chain and the gear wheel 35 moves the entire mangling means 10 in relation to the projectile fastening means 8, thereby accomplishing the mangling of the booster charge case firmly to the projectile, the latter being positioned such that its circumferential fixing groove is at the level of the mangling rolls. The wheel 35 could be located more close to the frame ring 30, for example, between this ring and the mangling jaws, whereby the torque applied thereto would be reduced.

Figure 4:
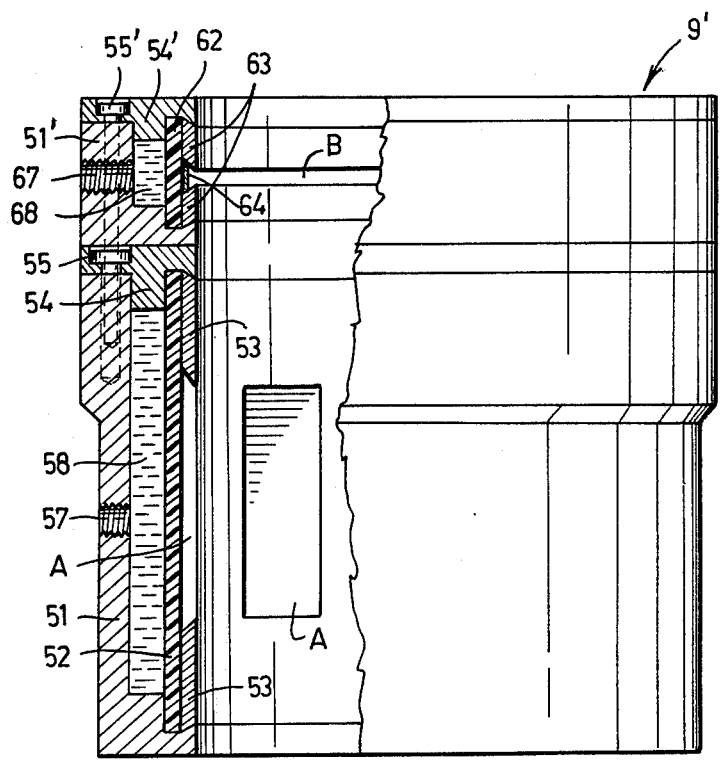

FIG. 4 shows partly in section another embodiment of the projectile receiving means and the means for fastening the booster charge case to the projectile, with the use of a pressure medium.

The means for receiving the projectile and the means for fastening the booster charge case to the projectile form an unit generally designated 9'. Unit 9' comprises two hollow cylindrical frames 51,51' recessed at its inner surface to receive a lower sleeve 53 and an upper sleeve 63 preferably aligned with the innermost surface of frame 51 to form a receiving space for the projectile and for the end of the booster charge case. The lower sleeve 53 is provided with openings A spaced around the circumference and being e.g. eight in number, and the upper sleeve 63 is provided with a continuous circumferential slot B at the position of the fixing groove of the projectile. Outside sleeves 53 and 63 are arranged sleeves 52 and 62 of a resilient material. Sleeves 52,53 and 62,63 are held in place by tightening rings 54,54', ring 54 being secured to frame 51 by means of bolts 55 and ring 54' being secured to frame 51' by means of bolts 55' which further secure frames 51 and 51' to each other. Frame 51, ring 54 and sleeve 52 form an annular chamber 58, sealed except for a passage 57 connectable to a pressure source, not shown, and frame 51', ring 54' and sleeve 62 form a similar chamber 68 with a passage 67 connectable to a pressure source. The upper half of sleeve 63 may be held in position by means of claws engaging in corresponding recesses in ring 54'.

When the projectile is positioned in the receiving means 9', an order from the control means causes hydraulic liquid to be forced, for example, by means of a pneumatic or a hydraulic cylinder into the chamber 58 and the resilient ring 52 will then project from the openings A and keep the projectile in place.

The operation of the case fastening is quite similar, only the force required is greater. The slot B is dimensioned so that the resilient sleeve 62 projecting therein will press the case into the groove of the projectile. To improve this process, a resilient metal ring 64 or similar may be inserted in the slot B.

When the seat 5 operated by the cylinder 4 moves the case 6 toward the projectile 8, the case can, if required, be controlled manually. However, more safely this can be done, for example, by means of a guide according to FIG. 4. This guide comprises two guide jaws 45 and 46 connected to each other by a link 42. Each jaw is through links 43 and 44 connected to the end of a piston ring 40 of a working cylinder 39 attached to the frame 1 at a suitable level. Between the end of the arm 40 and the link 42 is arranged a spring 41 keeping the jaws open. As the case arrives at a predetermined location, the cylinder forces the guide towards the case whereby the guide jaws 45 and 46 close the link 42 hits the case and guide the case precisely over the tail of the projectile. Hereafter the arm 40 is guided to retract whereby the jaws are opened.

The seat 5 is provided, for example, with three claws tending to open by spring action. Around the claws can be arranged ring pieces, around which is arranged a tightening wire 48 or similar the ends whereof are connected to a pneumatic cylinder 47. The operation of this cylinder is preferably controlled by an impulse valve 49 mounted in the seat and guiding and cylinder to tigthten the wire and thereby to make the claws engage the flange in the case when the case is properly installed in place in the seat. When the case is placed on the projectile, the cylinder will open.

Figure 5:
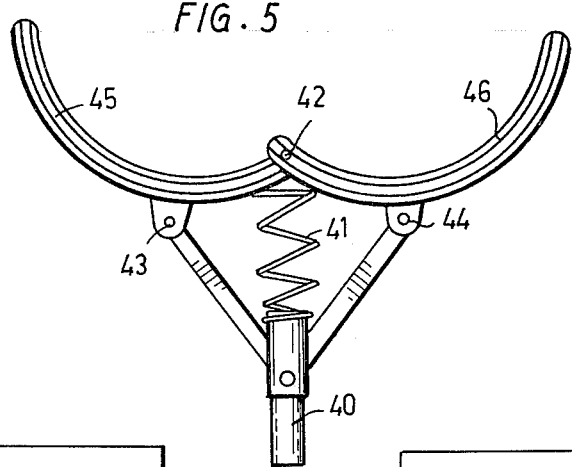
FIG. 5 is a view of guide for directing a case on a projectile.
Figure 6:
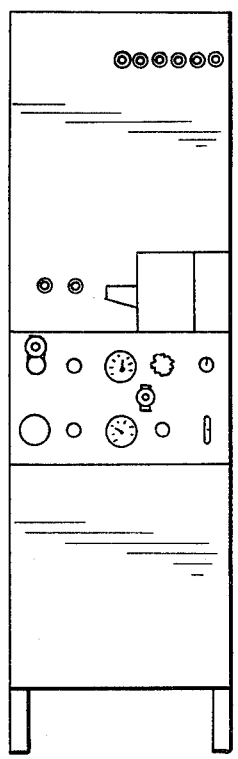
FIGS. 6 and 7 illustrate the control panel of the control system in the apparatus.
Figure 7:
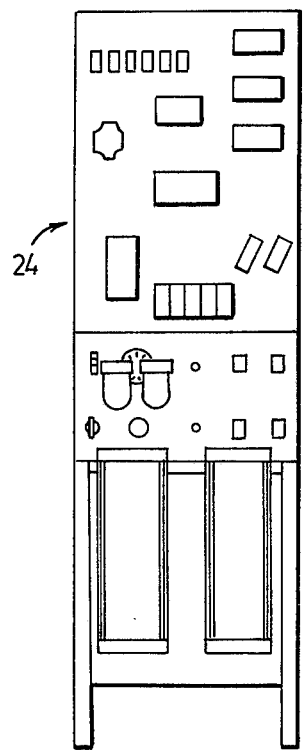

The operation of all working cylinders, 4,14,16,16′,17,25, 39 and 47 described above as well as the pressure application described in connection with FIG. 4 is controlled centrally by an automatic control system which in the drawing is outlined by the block 24. The control system preferably comprises a punched tape together with reading devices, whereby the operation of various members in each particular case can be appropriately controlled to obtain an optimal operation of the entire apparatus. The control is carried out from a separate control panel or cabinet shown in FIGS. 5 and 6. Due to this, the entire operation of the apparatus can be optimized and, as far as the worker is concerned, an essentially better safety is obtained than hitherto has been possible. The further details of the arrangement of the control system and the programme thereof need not be discussed in this context since suitable equipments are readily available.

The drawing illustrates a vertically mounted embodiment of the apparatus according to the invention, especially meant for shots of heavy bazookas or similar. The apparatus is also applicable for assembling artillery shots of various calibres. As the booster charge in artillery gun shots is preinstalled in the case before assembling the shots, it is preferred to mount the apparatus horizontally to ensure that the booster charge stays in the case. In this case, the projectile receiving means is programmed to be rigid in the required position.

What I claim is:

1. Apparatus for assembling a projectile of artillery calibre and a booster charge to a shot, comprising, a frame structure and mounted thereon,
   means for receiving and holding a projectile,
   means for receiving a booster charge case and bringing it onto the projectile to a fastening position,
   means for fastening the booster charge case to the projectile,
   pneumatically and/or hydralically operated drive means being provided for actuating said means for receiving and holding the projectile, said means for receiving a booster charge case and bringing it onto the projectile, and said means for fastening the booster charge case to the projectile, said drive means being controlled by a control unit in accordance with a preset programme, the projectile receiving means and the means for fastening the booster charge case to the projectile further being formed as one unit mounted in the frame pivotably between a vertical and an essentially horizontal position.

2. Apparatus according to claim 1, wherein the means for receiving the projectile comprises a stationary clamping jaw and a clamping jaw movable along guide rods and operated by a pressure driven member, the means for fastening the booster charge case to the projectile being a mangling means slideably journalled on the projectile receiving means and comprising hingedly journalled mangling jaws provided with mangling rolls, one of said jaws being connected to the piston rod of a working cylinder and the other one on the working cylinder itself for opening and closing said jaws.

3. Apparatus according to claim 2, wherein in order to set the mangling means in reciprocating rotary motion in relation to the projectile receiving member the mangling means is provided with a gear wheel on which is mounted a chain the ends whereof are connected to two altenately drawing working cylinders.

4. Apparatus according to claim 1, wherein the means for receiving the projectile comprises a cylindrical frame with a receiving sleeve arranged at its inner surface and provided with a number of openings spaced around the circumference, a resilient sleeve being arranged around said receiving sleeve and forming together with the frame an annular chamber connected to a pressure source, the means for fastening the booster charge case to the projectile comprising a cylindrical frame coaxial with and attached to the frame of the projectile receiving means, with a receiving sleeve arranged at its inner surface and provided with a circumferential slot, a resilient sleeve being arranged around said receiving sleeve and forming together with the frame an annular chamber connected to a pressure source.

5. Apparatus according to claim 4, wherein in the slot of the receiving sleeve of the fastening means is provided a resilient metal ring.

6. Appartus according to claim 1, wherein in order to guide to booster charge case precisely on the projectile, there is arranged between the means for holding and locating the booster charge case and the receiving means a guide means comprising a working cylinder attached to the frame structure, linked jaws (45,46) for guiding the case and mounted at the end of the cylinder rod, and a spring member acting on a link between the jaws for keeping the jaws in open position until said link hits the case.

7. Apparatus according to claim 1, wherein the control system comprises a tape reading device arranged on the control panel and provided with instruction means.

8. Apparatus according to claim 1, wherein the means for holding and disengaging the booster charge case comprise a seat provided with claws for engaging a flange in the case, and a working cylinder for controlling the operation of the claws by means of a wire or similar arranged around said claws.

* * * * *